United States Patent
Alessi et al.

(10) Patent No.: US 12,429,956 B1
(45) Date of Patent: Sep. 30, 2025

(54) METHOD AND SYSTEM TO DETECT TWO-HAND GESTURES

(71) Applicant: STMicroelectronics International N.V., Geneva (CH)

(72) Inventors: Enrico Rosario Alessi, Catania (IT); Alessandro Maio, Syracuse (IT); Fabio Passaniti, Syracuse (IT)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/604,361

(22) Filed: Mar. 13, 2024

(51) Int. Cl.
*G06F 3/01* (2006.01)
*G06F 3/0346* (2013.01)

(52) U.S. Cl.
CPC .............. *G06F 3/017* (2013.01); *G06F 3/015* (2013.01); *G06F 3/0346* (2013.01)

(58) Field of Classification Search
CPC ......... G06F 3/015; G06F 3/017; G06F 3/0346
See application file for complete search history.

(56) References Cited

U.S. PATENT DOCUMENTS

| | | | | |
|---|---|---|---|---|
| 2007/0124503 A1* | 5/2007 | Ramos | ................... | H04W 4/023 709/248 |
| 2009/0326406 A1* | 12/2009 | Tan | ......................... | G06F 3/017 341/20 |
| 2011/0175879 A1* | 7/2011 | Tanaka | ................. | H04B 13/005 709/204 |
| 2012/0268376 A1* | 10/2012 | Bi | ............................ | G06F 3/005 345/168 |
| 2013/0201164 A1* | 8/2013 | Omori | ................... | G06F 1/1626 345/204 |
| 2015/0070270 A1 | 3/2015 | Bailey et al. | | |
| 2015/0370320 A1 | 12/2015 | Connor | | |
| 2017/0285756 A1 | 10/2017 | Wang et al. | | |
| 2020/0310539 A1 | 10/2020 | Barachant et al. | | |
| 2022/0269346 A1 | 8/2022 | Hussami et al. | | |
| 2023/0019413 A1 | 1/2023 | Stern et al. | | |

FOREIGN PATENT DOCUMENTS

CN   110362190 A   10/2019

OTHER PUBLICATIONS

Chung et al., "Waveform reliability with different recording electrode placement in facial electroneuronography," *The Journal of Laryngology & Otology* 118(6):421-425, Jun. 2004. (5 pages).

(Continued)

*Primary Examiner* — Stephen G Sherman
(74) *Attorney, Agent, or Firm* — Seed Intellectual Property Group LLP (57) ABSTRACT

A wearable device includes an accelerometer, at least three electrodes to detect electromyography signal, a communication circuitry, and a processor circuitry. A user wears a primary and a secondary wearable device on two limbs. When the user performs a two-hand gesture, the wearable devices detect a primary and a secondary movement pattern. The primary device recognizes the two-hand gesture from the primary and secondary movement pattern.

17 Claims, 8 Drawing Sheets

(56) References Cited

OTHER PUBLICATIONS

Ghani et al., "Evaluation of Portable Potentiostats for Electrochemical Measurements: Voltammetry and Impedance Spectroscopy," 2022 IEEE 8th International Conference on Smart Instrumentation, Measurement and Applications (ICSIMA2022), Melaka, Malaysia, Sep. 26-28, 2022, pp. 132-137. (6 pages).

Morikawa et al., "Compact Wireless EEG System with Active Electrodes for Daily Healthcare Monitoring," 2013 IEEE International Conference on Consumer Electronics (ICCE), Las Vegas, NV, USA, Jan. 11-14, 2013, pp. 204-205. (2 pages).

Rassaei et al., "Lactate biosensors: current status and outlook," *Anal Bioanal Chem* 406:123-137, Sep. 14, 2013. (15 pages).

Reinschmidt et al., "Realtime Hand-Gesture Recognition Based on Novel Charge Variation Sensor and IMU," 2022 IEEE Sensors, Dallas, TX, USA, Oct. 30- Nov. 2, 2022. (4 pages).

Shin et al., "Controlling Mobile Robot Using IMU and EMG Sensor-based Gesture Recognition," 2014 Ninth International Conference on Broadband and Wireless Computing, Communication and Applications, Guangdong, China, Nov. 8-10, 2014, pp. 554-557. (4 pages).

Wang et al., "EMG-based Hand Gesture Recognition by Deep Time-frequency Learning for Assisted Living & Rehabilitation," 2020 11th IEEE Annual Ubiquitous Computing, Electronics & Mobile Communication Conference (UEMCON), New York, NY, USA, Oct. 28-31, 2020, pp. 0558-0561. (4 pages).

Wang et al., "Equivalent Impedance Models for Electrochemical Nanosensor-Based Integrated System Design," *Sensors* 21(9):1-17, May 8, 2021. (17 pages).

Yoshikawa et al., "Real-Time Hand Motion Estimation Using EMG Signals with Support Vector Machines," SICE-ICASE International Joint Conference, Busan, South Korea, Oct. 18-21, 2006, pp. 593-598. (6 pages).

Sun et al., "Gesture recognition algorithm based on multi-scale feature fusion in RGB-D images," The Institution of Engineering and Technology, Dec. 23, 2022. (27 pages).

Manoni et al., " Long-Term Polygraphic Monitoring through MEMS and Charge Transfer for Low-Power Wearable Applications," Sensors, Mar. 27, 2022. (19 pages).

STMicroelectronics, "Qvar sensing," Application note, AN5755, Rev 4, Aug. 2022, pp. 1-29.

Kim et al., "Secure communication system for wearable devices wireless intra body communication," IEEE International Conference on Consumer Electronics, Jan. 9, 2015, pp. 381-382.

\* cited by examiner

METHOD AND SYSTEM TO DETECT TWO-HAND GESTURES

BACKGROUND

Technical Field

The present systems, devices, and methods generally relate to wearable devices configured to detect acceleration and electromyography signals of a human body part, and gesture recognition using those wearable devices.

Description of the Related Art

A wearable device may include accelerometers or electromyography sensors to detect a movement of a limb of a user who wears such device. The detected movement may be used for gesture recognition. The detected movement data are sent to a different device, usually with more computational power, for example, a personal computer (PC) or a cloud service. Gesture recognition using a single wearable device such as a smart wristband to detect movement is well known. Gesture recognition utilizing a separate device such as a PC is well known.

Electromyography (EMG) is a technique to measure electrical signals that travels through the nervous system of a person to control muscle movements of the person's body. Movement of the human body is controlled by a complex network of neurons in the brain and spinal cord, collectively known as the motor system. Specifically, the process of moving fingers involves several steps, including:

Planning: The brain sends a signal to the motor cortex, which is responsible for planning and coordinating movement. The motor cortex creates a plan for the movement of the fingers based on sensory information from the environment and the individual's intentions.

Execution: Once the plan is created, the motor cortex sends a signal to the spinal cord, which contains the motor neurons that directly control the muscles of the fingers. The motor neurons release a neurotransmitter called acetylcholine, which causes the muscle fibers to contract and produce movement.

Feedback: During movement, the brain continuously receives feedback from sensory receptors in the fingers, such as pressure sensors and stretch receptors, which help to fine-tune the movement and adjust for changes in the environment.

The process of moving fingers starts from electrical signals originated in the brain, that pass through the wrist by using nerves such as ulnar, radial, and median nerves. Any disruption in this process, such as damage to the motor cortex or spinal cord, can lead to difficulties in finger movement and coordination. The electrical signals may be detected by EMG sensors including electrodes on a surface of a person's skin or electrodes in a form of a needle that penetrates a person's skin and directly coupled to a nerve tissue of the person. EMG signal is also known as Action Potential (AP).

BRIEF SUMMARY

Multiple wearable devices can be used to detect gestures that are made with more than one limb. In some embodiments, two wrist bands are used to detect two-hand gestures. Each wrist band includes an accelerometer capable of detecting three axes acceleration, at least three electrodes to detect electromyography (EMG) signal, communication circuitry, and processor circuitry. The processor circuitry is coupled with the accelerometer, the electrodes, and the communication circuitry. The processor circuitry receives data from the accelerometer and the electrodes and prepares a movement pattern. The movement pattern may include acceleration of each axis over a time period and an analog signal representing the action potential (the EMG signal) of the finger muscles over the time period. A first wrist band is a primary device and a second wrist band is a secondary device. The secondary device sends its movement pattern to the primary device via communication circuitry in the secondary device to communication circuitry in the primary device. The communication circuitry may use wireless communication such as Bluetooth or Wi-Fi, or it may use body contact transmission. The primary device receives two movement patterns, one from the primary device and the other from the secondary device. It is noted that the indication of primary and secondary device may be identified by the system in real time based on which write band first detects a significant movement.

For example, a user wears a wrist band on each of his wrists. The right hand wrist band is the primary device and the left hand wrist is the secondary device. When the user makes a two-hand gesture, by waving both his hands with left palm open and right palm closed, the left wrist band senses or detects acceleration readings related to a waving action and action potential readings related to an open palm, forming a left hand movement pattern. Similarly, the right wrist band senses or detects acceleration readings related to a waving action and action potential readings related to a closed palm, forming a right hand movement pattern. The left hand movement pattern is sent or otherwise transmitted to the right wrist band. The primary device, the right wrist band, receives the left hand movement pattern and processes both the left and the right hand movement patterns on the primary device. The primary device includes a database of stored gestures. The primary device executes a matching algorithm, for example, dynamic time warping (DTW), to match the processed movement patterns to a stored gesture, i.e. matching the pattern to a stored gesture of "waving both hands with left palm open and right palm closed". The detected gestures have many applications, for example, to interact with a virtual reality world, or to control a music player.

A gesture may include two limb motions simultaneously or sequentially. Motions of each limb may be the same or different. For example, a user may wave both his hands at the same time, or he may wave his right hand after he waves his left hand. A gesture may include only one limb movement. A gesture involving only one limb is different from a gesture that includes the same movement of the same limb but with additional movement on another limb. A gesture of two combined limb movements may be different from two gestures of the same limb movement but individually performed. For example, a user raising his right arm straight in front and above his head with an open palm is different from the user raising both arms straight in front and above his head with open palms. The limb may be a leg, and the wearable device an ankle bracelet. A necklace may be included to detect gestures including head movements such as nodding.

Microelectromechanical system (MEMS) sensors are used for their ability to measure physical quantities such as acceleration, angular speed, air pressure, acoustic waves by silicon-based micromechanical structures. MEMS sensors can be stand alone MEMS packages or integrated into a single silicon with other circuitry described further herein.

DETAILED DESCRIPTION

Figure 1A:
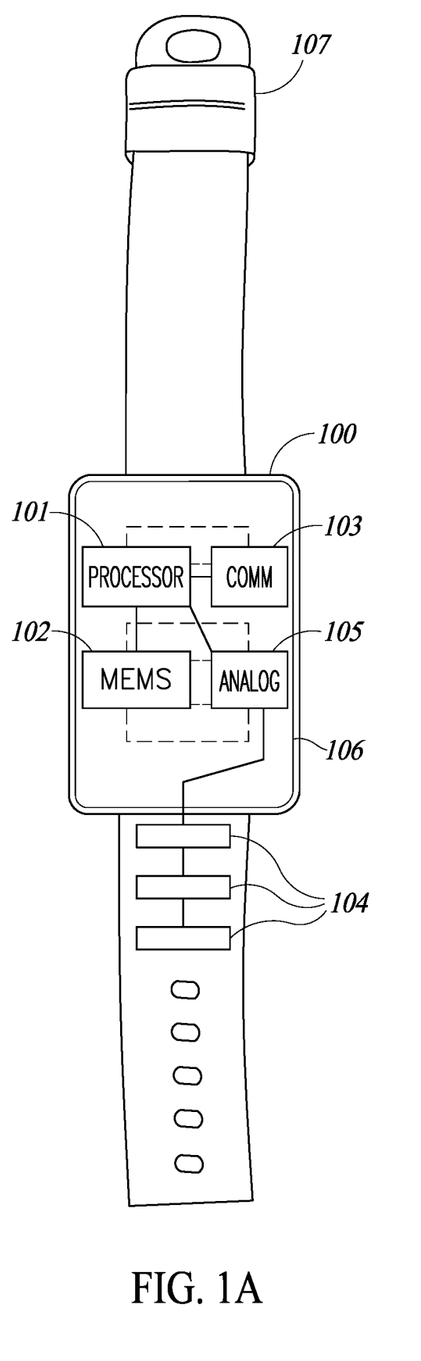
FIG. 1A is a wearable device according to some embodiments.

The present disclosure is directed to a system and method directed to dual or two hand gesture recognition by having two wearable devices, worn by a user on each arm, such as the wearable device 100A in FIG. 1A. The wearable device 100A is configured to be worn on a wrist or ankle and includes a band 108 with a latch 107 or other closure to keep the wearable device in place on a user's body. The wearable device 100A can be integrated into a smart watch or other user selected device or can be a stand-alone device specifically for gesture recognition. In some embodiments, the wearable device 100A may be configured to be worn on a neck as a necklace or an ankle.

The wearable device 100A includes a microelectromechanical system (MEMS) 102, which in some embodiments is an accelerometer that is configured to detect movement in three directions or axis, XYZ. In some embodiments, the MEMS 102 may include a gyroscope that is configured to detect angular movement or rotation in a plurality of axes. In various embodiments, the MEMS 102 is a six-axes motion sensor that is configured to detect both rotation and linear movement along three axes, for example, XYZ. The MEMS 102 is coupled to processor circuitry 101 to process the detected motion data. The MEMS 102 and processor circuitry 101 are inside of a housing 106A of the wearable device 100A. The wearable device may include a display on the surface facing away from the user's arm. The MEMS or sensor 102, processing circuitry 101, communication circuitry 103, and analog converter 105 are enclosed in the housing 106. These may be standalone packages coupled together on a printed circuit board in the housing or may be formed in a single chip that includes all of these elements.

The wearable device 100A further includes an EMG sensor that includes at least three electrodes 104A. In some embodiments the EMG sensor includes electrodes 104A on the band 108 and an analog converter 105 is inside the housing 106A. The electrodes 104A are configured to detect a plurality of EMG signals from the user's body, for example, arm. The electrodes 104A are coupled to the analog converter 105 which converts the EMG signals detected by the electrodes 104 to an analog signal before the processor circuitry 101 receives the analog signal. The analog converter 105 may also be known as an analog front end (AFE) 105. The electrodes 104A captures the nervous signals from brain to wrist when the user activates finger movements, for example, when the user contracts his palm to make a first or when the user relaxes his palm to make an open hand. In various embodiments, the processor circuitry 101 is configured to recognize signal patterns from the analog signal for determining an intent, which may be tens of milliseconds in advance with respect to a gesture actuation, of a specific gesture.

The at least three electrodes 104A are configured to be in contact with the user's skin surface, for example, on a top side of the user's wrist. In some embodiments, the electrodes may be incorporated into the band 105 facing the user's skin, outside of the housing 106, such as on an internal side of the user's wrist.

The wearable device 100A further includes a communication circuitry 103 inside the housing 106. The communication circuitry 103 is coupled with the processor circuitry 101. In some embodiments, the communication circuitry 103 transmits movement pattern data that is processed by the processor circuitry 101, the movement pattern data include data derived from a plurality of signals, such as acceleration data detected by the MEMS 102 or analog data derived from EMG signals detected by the electrodes 104A. In various embodiments, the processor circuitry 101 receives the movement pattern data from the communication circuitry 103, the movement pattern data originating from an external wearable device that is different from the wearable device 100A.

In some embodiments, the communication circuitry 103 includes radio frequency analog circuitry for wireless communication protocols, for example, Wi-Fi or Bluetooth. In various embodiments, the communication circuitry 103 includes circuitry enabling body contact communication. Body contact communication utilizes the skin of the user as transmission lines for electrical signals. The body contact communication signals are different from the EMG signals, and they do not interfere with each other. Body contact communication is suitable for applications such as the wearable device 100A because the wearable device 100A is in contact with the wearing user. Body contact communication may improve radio spectrum efficiency because the wearable devices 100A worn by a user need not broadcast radio signals such as the case when Wi-Fi or Bluetooth is used. In some embodiments, the communication circuitry 103 may utilize some electrodes 104A for body contact communication.

Figure 1B:
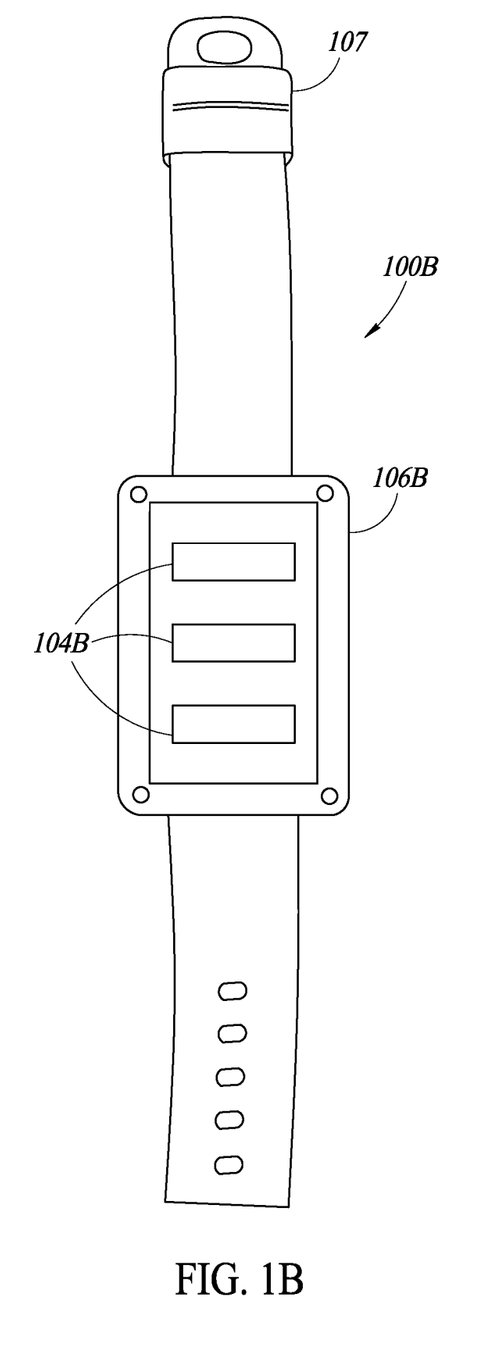
FIG. 1B is a wearable device according to some embodiments.

FIG. 1B is a wearable device according to some embodiments. On a wearable device 100B, three electrodes 104B for detecting EMG signals are directly coupled to a housing 106B on a back side. The processor circuitry, communication circuitry, and MEMS are in the housing 106B. In various embodiments, some of the electrodes 104A may be incorporated into the band 108 and the remaining electrodes 104B being incorporated into the housing 106A, 106B.

Figure 1C:
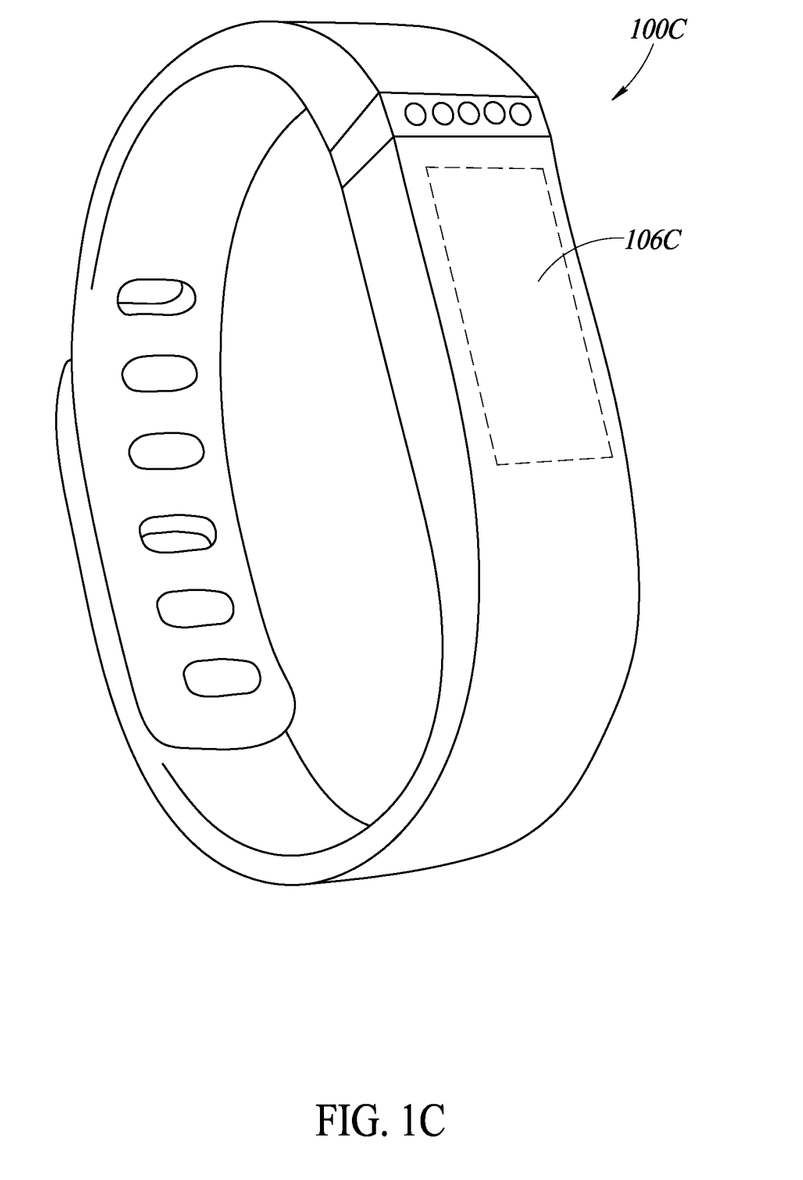
FIG. 1C is a wearable device according to some embodiments.

FIG. 1C is a wearable device according to some embodiments. A wearable device 100C may include a single package 106C which includes processor circuitry, communication circuitry, accelerometer, and electrodes.

Figure 1D:
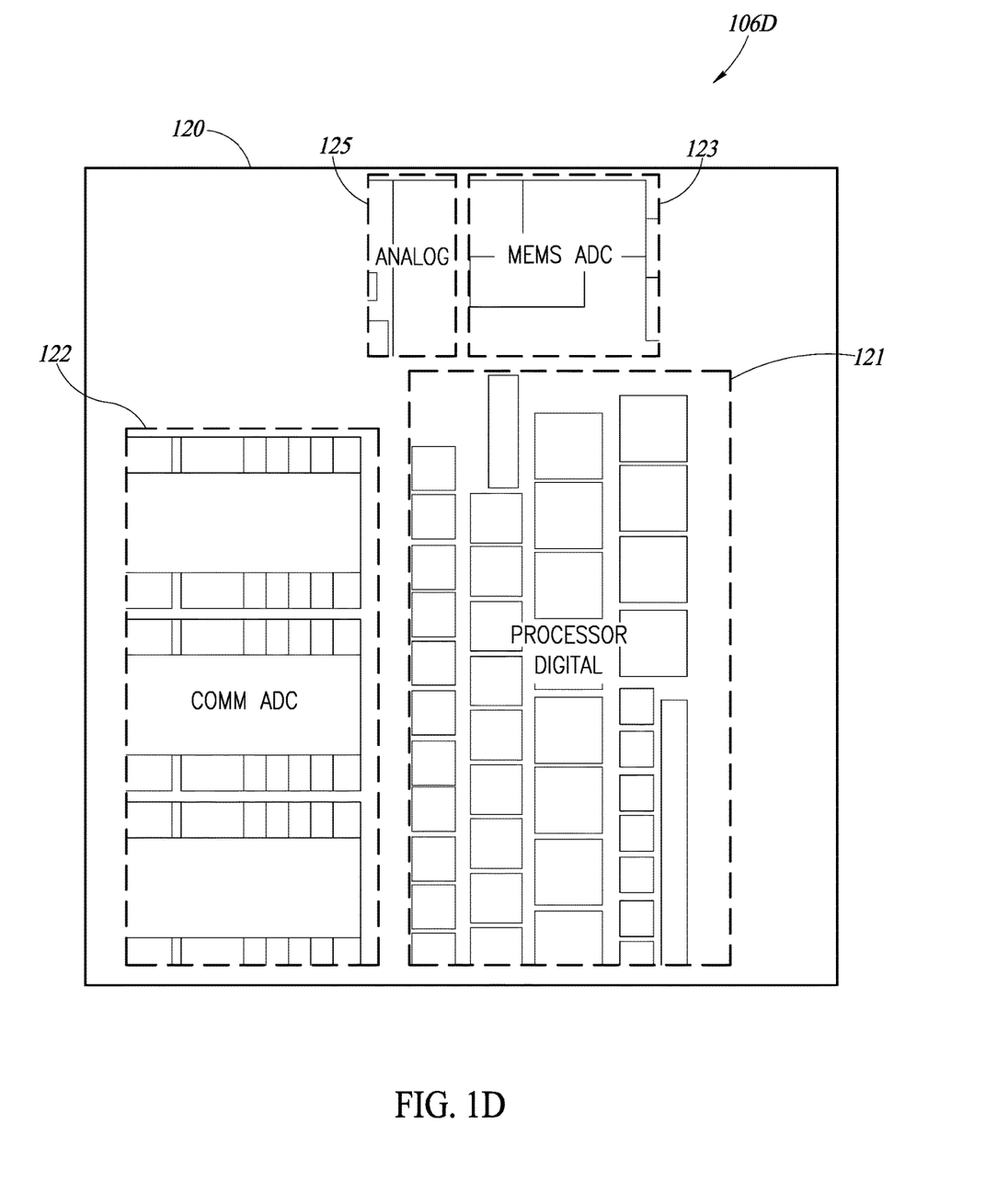
FIG. 1D is a chip for a wearable device according to some embodiments.

FIG. 1D is a chip for a wearable device according to some embodiments. Chip 106D includes a silicon die 120. The MEMS 102, analog front end 105, the processor circuitry 101, and the communication circuitry 103 may be integrated on a single silicon die 120. The silicon die 120 includes a processor circuitry area 121, a communication circuitry area 122, a MEMS area 123, and an EMG analog front end area 125. The processor circuitry area 121 includes a circuit configured to execute a program. In some embodiments, the processor circuitry is a general purpose digital computer central processing unit (CPU).

The communication circuitry area 122 includes circuitry for communication interface, for example, radio frequency circuitry and antenna interface for Bluetooth. In some embodiments, the communication area 122 includes circuitry configured to interface body contact communication. The communication circuitry area 122 includes an analog to digital converter (ADC) that converts different communication signals to a digital data that is suitable for processing by the processor circuitry 101.

The MEMS area 123 includes a MEMS structure configured to detect motion and an ADC configured to sense motion through the MEMS structure and convert the sensed motion to digital data suitable for processing by the processor circuitry 101.

This analog front end area 125 can be referred to as vertical Analog Front End (vAFE). The vAFE, includes analog circuitry for a task-specific analog sensing function in full synchronization with other sensing channels provided by the chip 106D, for example, the MEMS 102. This disclosure utilizes some examples of vAFE-featured chips in portable and wearable devices. It is possible to integrate vital sign monitoring with these electrodes and vAFE features.

The chip 106D is designed to provide accuracy and reliability in detecting, for instance, motion activity while minimizing power consumption and size, as well as addressing the data fusion of analog sensing data with motion channels. The design of this vertical analog front end can vary depending on the specific application requirements, such as the desired range, sensitivity, and bandwidth of the target analog sensing signal. With respect to the stand-alone analog front end devices that are mainly fully configurable and programmable but with costly die area, the vAFE are designed for fitting into the chips. The vAFE can be meant for executing a specific task where it's not necessary to have external circuitry out of the sensor itself. In some embodiments, analog sensing, accelerometer and gyroscope data are acquired in full synchronization enabling low power (200 uA @ full resources use) features extraction with high accuracy respect to standard system architecture with an external microcontroller and separated analog front end.

In various embodiments, the chip 106D provides vAFE with ESD protected pads, filters and amplifiers, while Analog to Digital converters, voltage references, power management are shared from conventional architecture. The design of a vAFE for a specific task is done by sharing the standard architecture and resources of the chip 106D by targeting a minimum die 120 area, making it a challenging design. The concept of library of vAFE plug in has been introduced as well with the meaning of a set of vAFE that are oriented to single tasks and with all the circuitry implemented according to MEMS sensor architecture.

Figure 2:
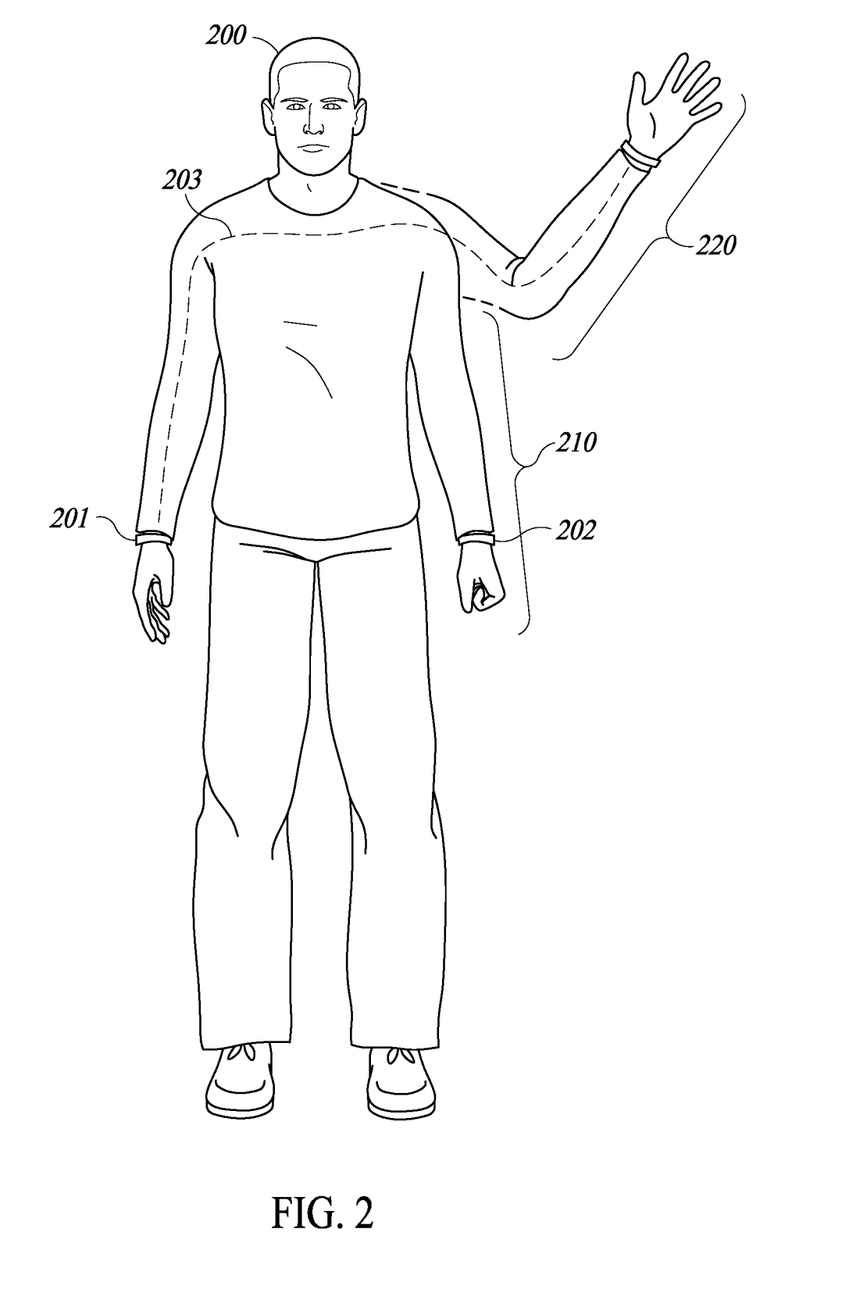
FIG. 2 is a system using two wearable devices according to some embodiments.

FIG. 2 is a system using two wearable devices according to some embodiments.

A double handed gestures recognition system utilizes vAFE and motion sensor MEMS placed in both wrists for collecting hand accelerations and EMG signals. The EMG signal travels from brain to hands crossing the wrist for driving fingers and hands movement. Electrodes are used for EMG signal collection. Accelerations and EMG patterns are used for classifying gestures by means of a Dynamic Time Warping based algorithm.

A user 200 wears a right smart wristband 201 on his right arm and a left smart wristband 202 on his left arm. The right wristband 201 and the left wristband 202 are connected via a body contact communication link 203. Each of the right wristband and the left wristband is a wearable device 100A according to some embodiments.

The wristbands 201, 202 detect a gesture made by the user 200. For example, the user 200 rests his left arm with a closes palm 210 and makes a gesture by raising and waving his left hand and opening his left palm 220 over a time period. The MEMS 102 of the left wristband 202 detects acceleration on three axes over the time period that corresponds to a raising and waving motion, and the electrodes 104 of the left wristband 202 detects EMG signals related to a relaxation of the palm. The MEMS 102 of the right wristband 201 detects acceleration data on three axes corresponding to an idle position 230 over the time period and its electrodes 104 detects EMG signals related to a contraction of the palm 230. The EMG signals are combined to generate an analog signal by the analog front end 105. Acceleration data is recorded over the time period. The analog signal and the acceleration data are combined to form a movement pattern by the processor circuitry 101. The left wristband 202 sends its movement data to the right wristband 201 via the communication link 203. The right wristband 201 receives the movement data from the communication link 203. The right wristband 201, with its processor circuitry 101, detects a gesture "raising and waving a left hand with an open palm while resting a right hand with a closed palm" based on its movement pattern and the movement pattern sent by the left wristband 202. In some embodiments, the right wristband 202, detects the gesture by executing a matching algorithm, for example, Dynamic Time Warping (DTW), with the processor circuitry of the right wristband 202.

FIG. 3A-3D are examples of dual hand gestures that may be detected by some embodiments.

Figure 3A:
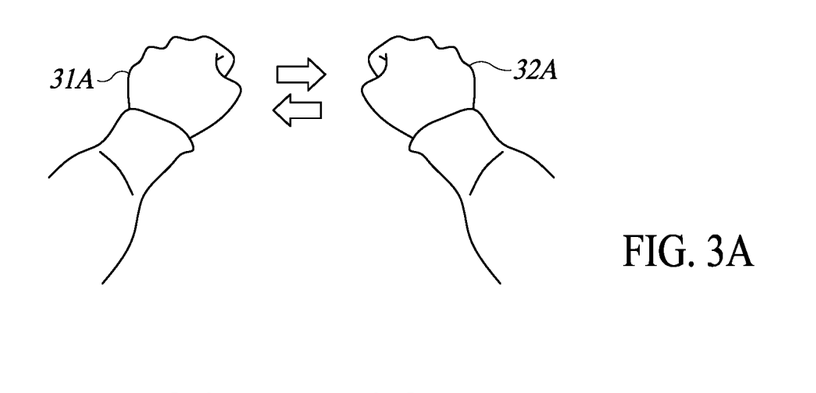
FIG. 3A-3D are examples of dual hand gestures that may be detected by some embodiments.

FIG. 3A is a "rewind" gesture. Both a left hand 31A and a right hand 32A hold a first with closed palms. The left hand 31 moves towards the left and away from the right hand 32A. The right hand 32A moves towards the right and away from the left hand 31A. In various embodiments, this gesture may be used to interact with a virtual reality environment, an electronic such as a music player, or a computer system. The "rewind" gesture may cause a music player or video player to rewind a content that is being played. In some embodiments, the "rewind" gesture may cause an image to zoom out on an image viewing software.

Figure 3B:
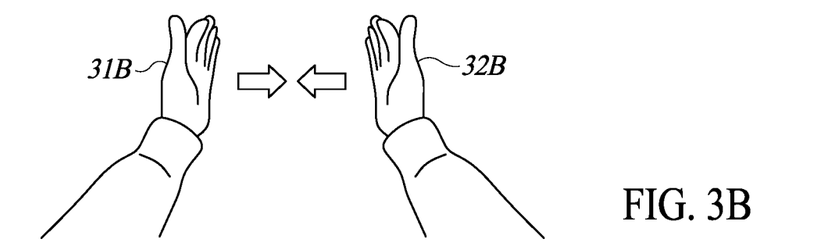

FIG. 3B is a "clap" gesture. Both a left hand 31B and a right hand 32B are open and facing each other. The left hand 31B and right hand 32B move towards each other and hit each other at a center point, making a clap noise. In various embodiments, this gesture may be used to interact with a virtual reality environment, an electronic such as a smart lamp, or a computer system. In some embodiments, the "clap" gesture may cause a smart lamp to turn on or off, or may cause a music player or video player to start or stop a content being played.

Figure 3C:
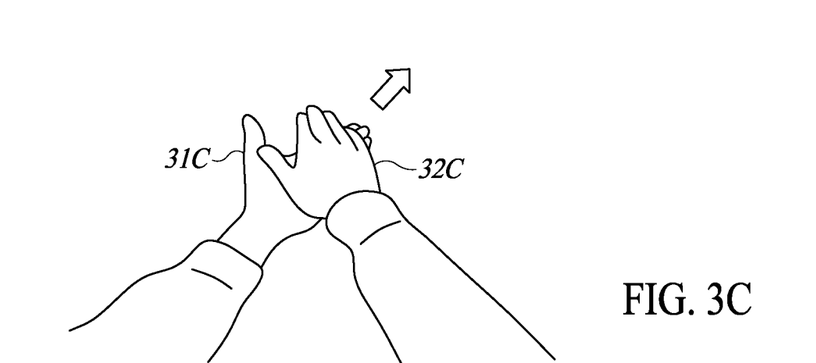

FIG. 3C is a "slide" gesture. Both a left hand 31B and a right hand 32B are open. The left hand 31C faces up and the right hand 32C facing down. The right hand 32C laying on top of the left hand 31C. The left hand 31C remains stationary and the right hand 32C slides away towards a front side. In various embodiments, this gesture may be used to interact with a virtual reality environment, an electronic such as a music player, or a computer system. The "slide" gesture may cause a music player or video player to play a next item from a play list. In some embodiments, the "slide" gesture may cause a contact book application on a smartphone to show a next page of contacts. In a card game application, the "slide" gesture may cause a player character to deal a virtual playing card.

Figure 3D:
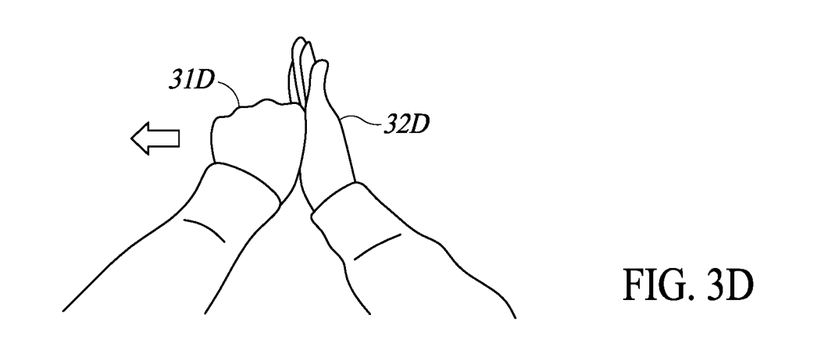

FIG. 3D is a "Pull" gesture. A left hand 31D holds a first with palm facing down and a right hand 32D is open with palm facing left. The left hand 31B moves towards left, away from the right hand 32D and the right hand 32D remains stationary. In various embodiments, this gesture may be used to interact with a virtual reality environment, an electronic such as a music player, or a computer system. In some embodiments, the "pull" gesture may cause a document viewer application to zoom out from a page displaying. In a video game, the "pull" gesture may cause a player character to draw a weapon.

The gestures shown in FIGS. 3A, 3B, 3C, 3D may be stored in a gesture database according to some embodiments. The gestures shown are performed through a time period. The time period may vary, and a different length in performing each gesture may have different meanings and different references in the gesture database in some embodiments. For example, a "pull" gesture performed in a course of one second ("fast pull") is different from a "pull" gesture performed in three seconds ("slow pull"). A gesture may include movements along a plurality of directions.

Figure 4:
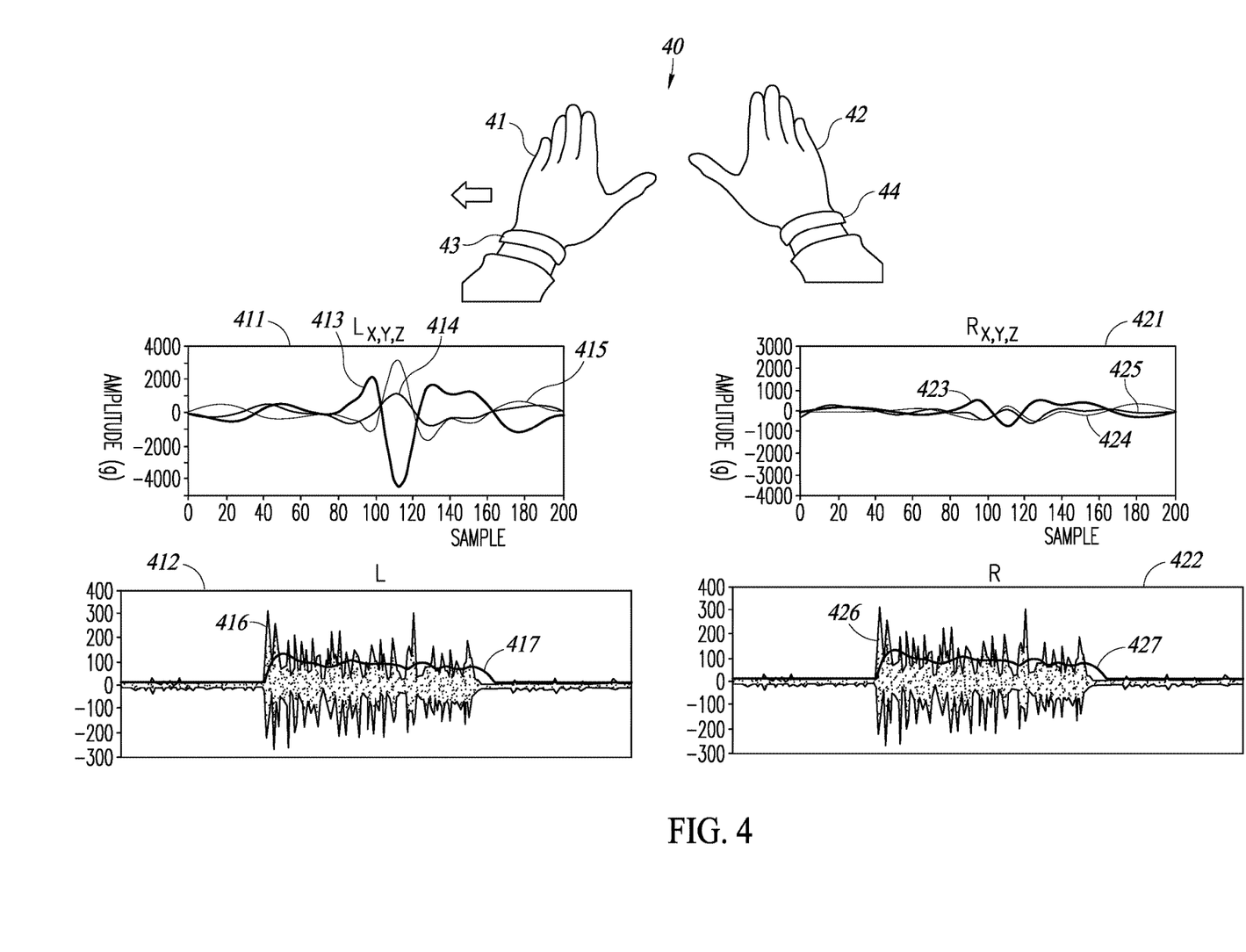
FIG. 4 is an example readout of a wearable device according to some embodiments.

FIG. 4 is an example readout of a wearable device 43, 44 according to some embodiments. A user wearing two wearable devices, one on each wrist, performs a "scroll" gesture 40. In the "scroll" gesture 40, both a left hand 41 and a right hand 42 are open. The left hand 41 moves, over a time period, for example one second, horizontally towards the left and the right hand 42 remains stationary.

A left wristband 43 is worn on the left hand 41. Chart 411 shows readings from the MEMS accelerometer in the left wristband 43. Lines 413, 414, 415 show the acceleration of the left wristband 43 over the time period on x, y, and z axes respectively. The lines 413, 414, 415 indicates a horizontal movement towards the left during the time period. Chart 412 shows the EMG readings from the electrodes of the left wristband 43. Line 416 is an envelope of a signal of an electrode over the time period. Chart 412 is simplified to show only the envelope 416. The EMG signal varies within the boundaries of the envelope 416. Line 417 is an analog signal that is processed by the EMG analog front end of the left wristband 43. Each line 413, 414, 415, 416 is a time sequence. The data from lines 413, 414, 415, 417 forms a left movement pattern.

A right wristband 44 is worn on the right hand 42. Chart 421 shows readings from the accelerometer in the right wristband 44. Lines 423, 424, 425 show the acceleration of the right wristband 44 over the time period on x, y, and z axes respectively. Chart 421 indicates a stationary position over the time period. Chart 422 shows the EMG readings from the electrodes of the right wristband 44. Line 426 is an envelope of a signal of an electrode over the time period. Chart 422 is simplified to show only the envelope 426. The EMG signal varies within the boundaries of the envelope 426. Line 427 is an analog signal that is processed by the EMG analog front end of the right wristband 44. Each line 423, 424, 425, 427 is a time sequence. The data from lines 423, 424, 425, 427 forms a right movement pattern.

In some embodiments, the movement patterns may be stored in a way that can be processed by the processor circuitry, for example, in binary form. The movement pattern may include additional data, for example, rotational movement and position. In various embodiments, the movement pattern may include a plurality of analog signals that corresponds to a plurality of EMG signals detected by electrodes and further processed by the analog front end.

Figure 5:
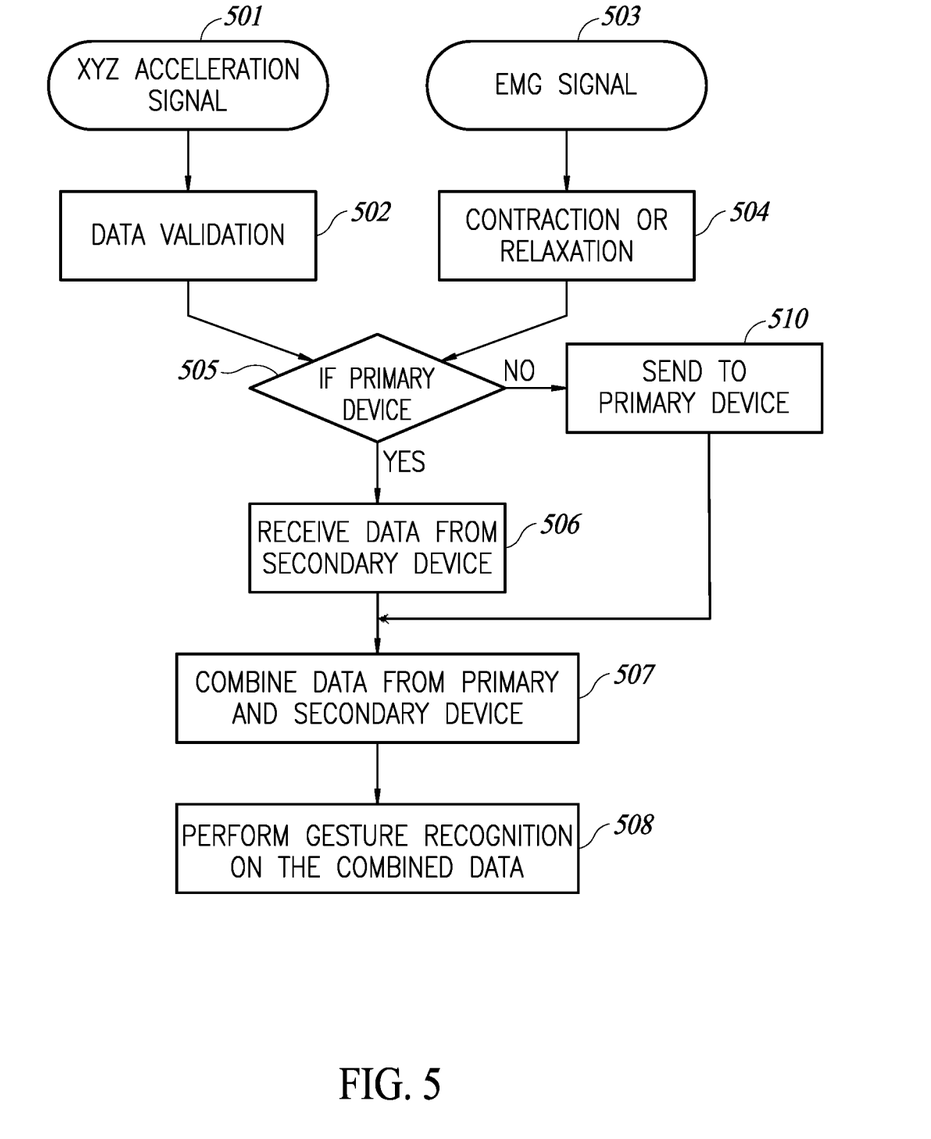
FIG. 5 is a flow diagram showing the data flow between two wearable devices according to some embodiments.

FIG. 5 is a flow diagram showing the data flow on a wearable device in a system including two wearable devices according to some embodiments. When a user performs a gesture, a wearable device detects acceleration signals in the x, y, and z axes over a period at 501. The acceleration signals 501 are validated in a step 502 to prevent false positives, for example, when the user is on a moving bus and acceleration is detected. The wearable device detects a plurality of EMG signals at 503. An analog front end converts the EMG signals to an analog signal representing a contraction or a relaxation of the hand in a step 504. The acceleration signals and the analog signal forms a movement pattern. The movement pattern includes data representing the acceleration on each axes and the analog signal over the period.

In one embodiment, the primary device is identified as the device of the two wearable devices that first detects a significant movement pattern. Both devices have the same role in triggering data acquisition to the other device. If a significant action has been identified and validated firstly on a first one of the device, this is the primary device. This primary device sends a trigger command to the other, secondary device, requesting a data acquisition start, for the whole time frame, regardless of whether the signal in the secondary device, at that instant, is above or below a threshold of interest. This "peer to peer" approach permits to collect and store signals that are not in phase, maintaining their relative time shift, independently from the device that starts the process. In FIG. 5, this "peer to peer" approach would omit the steps 505 and 510, such that once a significant movement is detected, that wearable device that becomes the primary device will request and receive data from the secondary device at 506.

It is envisioned that the system could have one of the wearable devices be identified as the primary device in all instances, such that the step 505 is included in the system to determine if the significant movement pattern first detected is in the wearable device that is the primary device at 505. If the significant movement is in the secondary device in a fixed system, the secondary device sends its movement pattern to the primary device at 510. If the significant movement is first detected in the primary device, the primary device requests receives the movement pattern from the secondary device at 506.

The primary device may receive a movement pattern spontaneously at the instance or within a small period of time when the primary device detects a gesture that includes motion in both limbs and the secondary device also detected acceleration or EMG signals. When a gesture includes motion only on the limb with the primary device, the primary device will request a movement pattern from the secondary device by sending a command to the secondary device. The primary device now has two movement patterns, one from the secondary device and one from its accelerometer and its EMG electrodes. The primary device combines the two movement patterns 507. The primary device performs gesture recognition on the combined data at 508.

Figure 6:
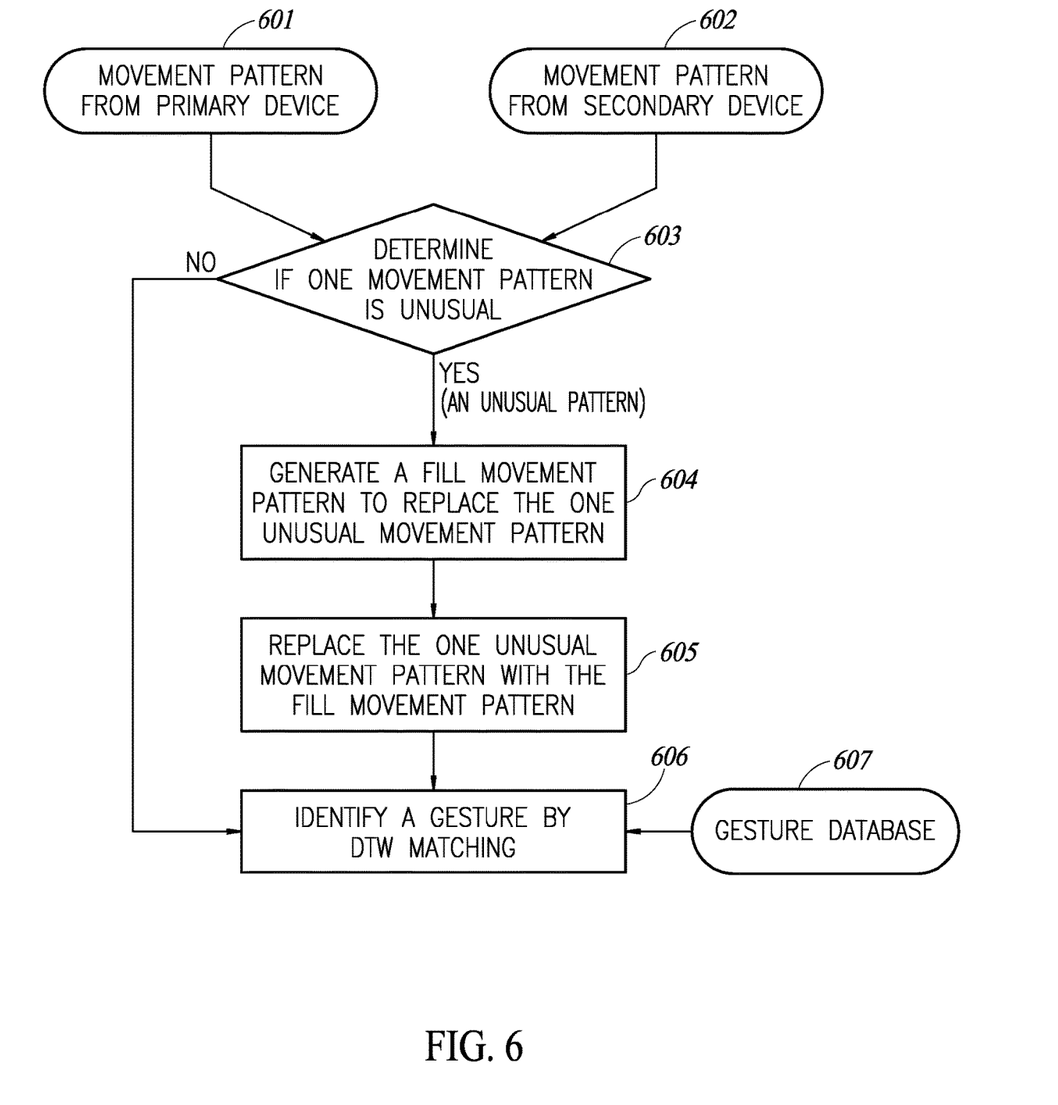
FIG. 6 is a flow diagram showing the steps to determine a dual hand gesture according to some embodiments.

FIG. 6 is a flow diagram showing the steps to determine a dual hand gesture according to some embodiments. The primary device generated a movement pattern 601 and received a movement pattern from the secondary device 602. The primary device determines whether the two movement patterns are usual 603. A usual movement pattern is one that represents a movement of a limb, for example, a waving motion. An unusual movement pattern is one that represents noise from the sensors, for example, the MEMS, that shows motion but does not represent a limb motion. One of the two movement patterns may be unusual because the arm on which the wearable device is worn has not moved, for example, in a gesture where one hand remains stationary.

If there is one unusual movement pattern 603, the primary device generates a fill movement pattern to replace the invalid movement pattern 604. There would not be two unusual movement patterns because a gesture is not made when both limbs are not moving. The fill movement pattern includes clean acceleration signals to represent a non-moving hand. In some embodiments, the fill movement pattern is generated from by the processor circuitry. In various embodiments, the fill movement pattern is stored in a non-transient data storage on the primary device and the processor circuitry accesses the non-transient data storage to retrieve the fill movement pattern. The primary device replaces the unusual movement pattern with the fill movement pattern for gesture recognition 605. The fill movement pattern is used instead of the unusual movement pattern for further processing by the primary device.

The primary device matches the combined data of the two movement patterns with possible gestures 606 in a gesture database 607. The gesture database 607 is stored on a non-transient memory of the primary device. In some embodiment, the primary device uses Dynamic Time Warping (DTW) to match the combined movement pattern with a gesture from the gesture database 607. DTW is an algorithm that measures similarity between two temporal sequences. Movement patterns are temporal sequences because they record acceleration data over a time period. DTW measures similarity between the movement patterns and gestures in the gesture database 607 and matches a gesture with a highest similarity. DTW requires processing of an amount of data that is not possible to be performed by the human mind in any reasonably way or completed in a time required for any embodiment to practically function.

The matched gesture is output for further use. In some embodiments, the matched gesture is used to control the wearable device. For example, to start or stop a timer on a fitness smart watch, or to shuffle to a next song on a music streaming service. In various embodiments, the matched gesture is used to interact with an external device. For example, to control a smart TV or to dim a smart lightbulb. The gestures may be used to interact with a virtual or augmented reality environment. For example, a movement of an arm of a user may cause a virtual character to move its arm. A contraction of a user's hand may cause a character to pick up a virtual item in the virtual reality environment.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method to detect hand gestures, comprising:
    receiving a first movement pattern by a first wearable device, the first wearable device, wherein receiving the first movement pattern by the first wearable device includes:
        receiving a first plurality of acceleration data from a first accelerometer over a time period, the accelerometer being on the first wearable device; and
        receiving a first plurality of electromyography (EMG) signals from a first EMG sensor on the first wearable device over the time period;
    receiving a second movement pattern by a second wearable device, the second wearable device, wherein receiving the second movement pattern by the second wearable device includes:
        receiving a second plurality of acceleration data from a second accelerometer on the second wearable device over the time period; and
        receiving a second plurality of EMG signals from a second EMG sensor on the second wearable device over the time period;
    transmitting the second movement pattern from the second wearable device to the first wearable device; and
    detecting a gesture by the first wearable device, including:
        matching a gesture from the gesture database with the first movement pattern and the second movement pattern, the matching including:
            determining if the first movement pattern or the second movement pattern is invalid;
            generating a fill movement pattern in response to determining at least one of the first movement pattern and the second movement pattern is invalid; and
            replacing the one invalid movement pattern with the fill movement pattern.

2. The method of claim 1, wherein transmitting the second movement pattern from the second wearable device to the first wearable device uses body contact transmission.

3. The method of claim 1, further comprising:
    generating a first analog signal from the first plurality of EMG signals, and
    generating a second analog signal from the second plurality of EMG signals.

4. The method of claim 3, wherein the first EMG sensor includes at least three electrodes, and the second EMG sensor includes at least three electrodes.

5. The method of claim 4, further comprising:
    processing the first analog signal to determine contraction or relaxation of a first hand, and
    processing the second analog signal to determine contraction or relaxation of a second hand.

6. The method of claim 1, wherein receiving a movement pattern further comprises:
    validating the plurality of acceleration data from the accelerometer.

7. The method of claim 1, wherein the matching algorithm is Dynamic Time Warping.

8. A system, comprising:
    a first wearable device, configured to be worn by a user on a first limb, wherein the first wearable device includes:
        a first accelerometer, the first accelerometer configured to detect acceleration in at least three axes;
        at least three first electrodes, the first electrode configured to detect electromyography (EMG) signal;
        a first processor circuitry,
        a first memory, and
        a first communication circuitry; and
    a second wearable device, configured to be worn by the user on a second limb, the second wearable device being configured to:
        detect a second limb movement of the second limb, and
        transmit a second limb movement pattern to the first wearable device, the first wearable device begin configured to detect a gesture with the first processor circuitry in response to the second limb movement, wherein the first limb is a first arm of the user and the second limb is a second arm of the user, and the first wearable device is configured to generate a first analog signal from EMG signals detected by the at least three first electrodes over a time period with a first analog to digital converter, wherein the second limb movement pattern comprises:

a plurality of acceleration data over the time period, and a second analog signal generated from EMG signals detected by at least three second electrodes over the time period, the first analog signal representing a first contraction or relaxation of a first hand of the user; and the second analog signal representing a second contraction or relaxation of a second hand of the user;

wherein the first wearable device is further configured to:

validate a first plurality of acceleration data detected by its accelerometer;

validate a second plurality of acceleration data included in the second limb movement pattern; and if one of the first plurality of acceleration data or the second plurality of acceleration data is invalid:
generate a fill acceleration data; and
replace the one invalid plurality of acceleration data with the fill acceleration data.

9. The system of claim 8, wherein the first communication circuitry includes body contact communication.

10. The system of claim 8, wherein the first wearable device is configured to detect a gesture by performing:

executing, on the first processor circuitry, a matching algorithm to a gesture database, the gesture database being on the first memory; and matching a gesture from the gesture database with the first plurality of acceleration data and the second plurality of acceleration data.

11. The system of claim 10, wherein the matching algorithm is Dynamic Time Warping.

12. The system of claim 11, wherein the first wearable device is configured to detect a gesture by further performing:

validating the matched gesture with the first analog signal and the second analog signal.

13. The system of claim 12, wherein the first processor circuitry, the first communication circuitry, the first accelerometer, and the first analog digital converter are made on a single silicon die.

14. A system, comprising:
a first wearable device;
a second wearable device that includes:
an accelerometer;
at least three electrodes configured to detect electromyography signal;
a processing circuitry, and
a communication circuitry, the second wearable device configured to:
prepare a first movement pattern from a plurality of acceleration data from the accelerometer over a time period and a plurality of EMG signals from the at least three electrodes over the time period;
receive a second movement pattern from the first wearable device; and
match a gesture from a gesture database with the first movement pattern and the second movement pattern;
validate the first movement pattern;
validate the second movement pattern; and
if one of the first movement pattern or second movement pattern is invalid:
generate a fill movement pattern; and
replace the one invalid movement pattern with the fill movement pattern.

15. The system of claim 14, wherein the communication circuitry includes body contact communication.

16. The system of claim 14, wherein the first movement pattern further includes:
an analog signal generated from the at least three electrodes, the analog signal representing a contraction or relaxation of a hand of a user.

17. The wearable device of claim 16, comprising:
an analog digital converter to generate the analog signal, wherein the processor circuitry, the communication circuitry, the accelerometer, and the analog digital converter are made on a single silicon die.

* * * * *